United States Patent [19]

Carlsson

[11] 4,432,144

[45] Feb. 21, 1984

[54] ARRANGEMENT FOR MEASURING AND CHECKING MOTORCYCLE FRAMES

[75] Inventor: Harry Carlsson, Köping, Sweden

[73] Assignee: AB Samefa, Kungsoer, Sweden

[21] Appl. No.: 350,833

[22] Filed: Feb. 22, 1982

[30] Foreign Application Priority Data

Mar. 12, 1981 [SE] Sweden .............................. 8101597

[51] Int. Cl.³ .............................................. G01B 5/25
[52] U.S. Cl. .............................. 33/180 AT; 33/174 R; 33/288; 33/203
[58] Field of Search ........ 33/174 J, 180 AT, 181 AT, 33/288, 203, 203.2, 203.21, 174 P, 174 PA, 174 R

[56] References Cited

U.S. PATENT DOCUMENTS 4,302,883  12/1981  MacGregor .................. 33/180 AT

FOREIGN PATENT DOCUMENTS 94346  10/1956  Norway ............................ 33/174 C

*Primary Examiner*—Harry N. Haroian
*Attorney, Agent, or Firm*—Flynn, Thiel, Boutell & Tanis

[57] ABSTRACT

According to the invention an arrangement (10) is proposed for measuring and checking motorcycle frames, comprising a measuring beam (14) which is attached to one side of the motorcycle frame which is to be checked, parallel thereto and preferably at the so-called pivot-point of the frame. One or more uprights (16, 18) at right-angles to the beam (14) can be moved along the beam and themselves bear movable mountings (24, 28) with adjustable measuring points (26, 30). The latter can be made to seek out desired points on the frame, and with the aid of appropriate scales or calibrations the co-ordinates of the points relative to the pivot point can be determined. Two such measuring arrangements (10) placed one on each side of the motorcycle frame can be connected together by means of transverse bridges or the like to form a stable measuring stand. The arrangement is such that frame measurements can be carried out whether the frame has been dismantled or forms part of a complete motorcycle, and furthermore measurements can be carried out even if the frame or the motorcycle is set up in a straightening device, so-called traction jig.

12 Claims, 9 Drawing Figures

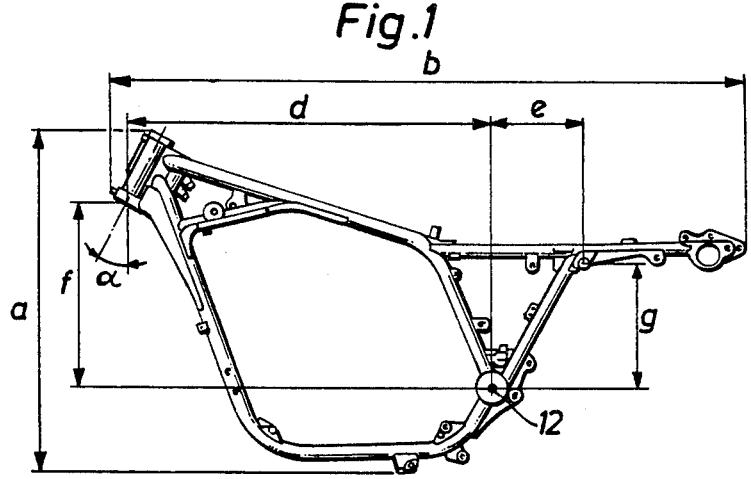
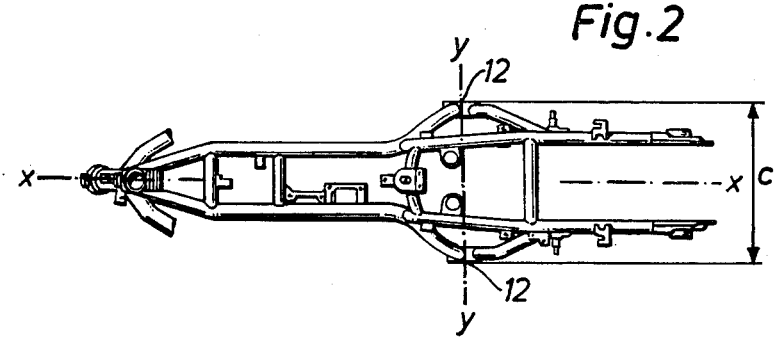
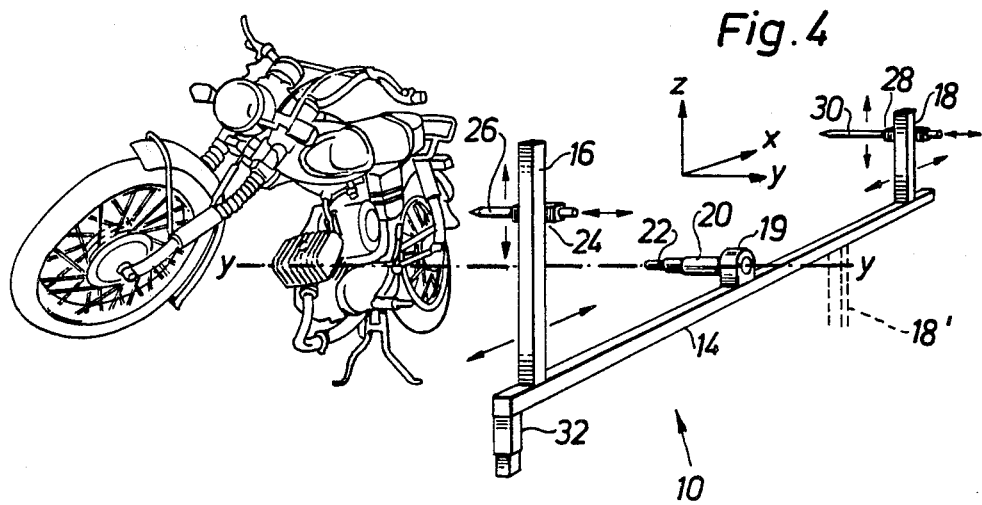

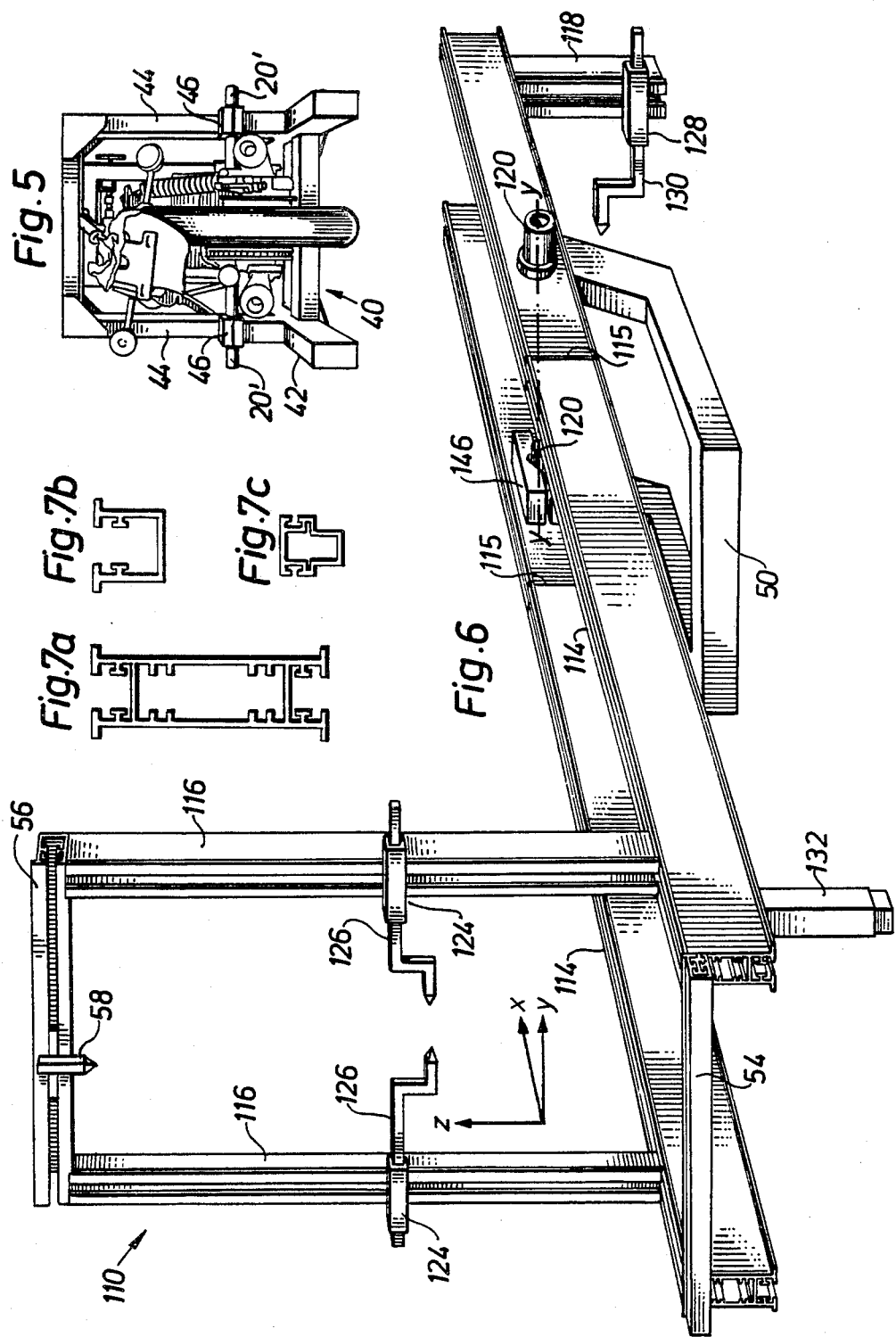

ARRANGEMENT FOR MEASURING AND CHECKING MOTORCYCLE FRAMES

The present invention relates to an arrangement for measuring and checking motorcycle frames, particularly an arrangement which is constructed so that the measurements and checks can be carried out without the frame being exposed, that is, without the engine, petrol tank, wheels, etc. having been released and removed from the frame.

The frame on a modern motorcycle consists of welded steel tube and forms a spatial framework with a very intricate shape. The design is such that the frame, which of course forms the central, bearing structure of the motorcycle, should be as stable as possible and able to withstand without deformation the stresses to which the motorcycle is exposed as it is being ridden. It should also be able to survive mishaps of a lesser kind, such as slight collisions and the like. In such cases when the motorcycle is exposed to severe stresses the motorcycle frame may be deformed to a greater or lesser extent, and in the field of repair technology such deformed motorcycle frames present considerable problems.

The said problem may be said to be two problems: the problem of straightening up the damaged frame (assuming that the material of the frame is not fractured or damaged beyond repair, and that the shape of the frame can be restored in a plastic manner), and the problem of checking that the frame has been restored to its original dimensions.

It is known to provide so-called traction jigs in which the deformed motorcycle frame is set up and wherein, with the aid of suitable hydraulic or mechanical traction devices designed to generate force in various directions, the frame can be forced to assume its original shape again gradually. There has not hitherto been an acceptable solution to the other problem, that of measuring and checking the frame straightened in this way.

Motorcycle manufacturers provide accurate frame drawings, indicating all the important dimensions, but when actually operating in the workshop there are considerable difficulties in checking with an acceptable level of accuracy that a repaired motorcycle has actually regained its original frame dimensions. All the components of the motorcycle which are suspended in the frame and conceal it to a greater or lesser extent constitute a particular problem. To repair a damaged motorcycle it is more expedient to "clear out" the frame, i.e. remove the engine, petrol tank, seat, wheels, etc. and subject the frame, thus exposed, to a straightening process. However, this dismantling and subsequent assembly is extremely time-consuming and costly and in many cases it is not the components themselves which are damaged but the bearing frame which has been dented or bent, perhaps quite insignificantly, but still enough to make straightening absolutely essential. The above-mentioned traction jigs are designed so that they can take motorcycles without any dismantling to speak of, in order to carry out the necessary straightening operations on the motorcycle as a whole.

However, as stated, until now no satisfactory solution has been found to the problem of subsequent checking. It is difficult to carry out the necessary checking measurements on the motorcycle set up in the traction jig while the necessary straightening operations are being gradually carried out; straightening and checking should of course go hand in hand.

Another important checking problem involves the free-standing motorcycle, i.e. before it is set up in a traction jig for possible straightening. The deformation of a motorcycle frame may be serious but still difficult to detect with the naked eye, and there is thus a need for a measuring arrangement which can be used on a free-standing motorcycle to check vital points on the frame, to make it possible to establish if, and to what extent, the frame is damaged. There is a particular need for such a measuring arrangement outside in the field, for example, at the site of an accident, so that an assessment can be made at this point of the damage which has occurred to a motorcycle involved in the accident.

The invention therefore has the aim of providing a measuring arrangement for motorcycle frames, with the aid of which the dimensions of such a frame can be checked rapidly and easily, whether the motorcycle is entire, or completely or partially dismantled, and whether the motorcycle is free-standing or clamped into a traction jig of the above-mentioned type. This aim is achieved and an accurate and easily handled arrangement is provided for this purpose by endowing the measuring arrangement according to the invention with the characteristics indicated in patent claim 1.

The invention will now be described by way of example with reference to the accompanying drawings, on which FIGS. 1 and 2 show a side view and a plan view respectively of a typical motorcycle frame with the important dimensions marked.

FIG. 3 shows schematically a damaged motorcycle, and related to this FIG. 4 shows the principle component parts of a measuring arrangement according to the invention.

FIG. 5 is a very schematic perspective view from the rear, showing a typical traction jig for motorcycle frames with a motorcycle clamped in it.

FIG. 6 is a perspective view of an actual embodiment of a measuring arrangement according to the invention, and finally, FIGS. 7a–c show in cross-section suitable extruded aluminium profiles from which the embodiment of the measuring arrangement is made up.

FIGS. 1 and 2 therefore show a typical frame drawing of the kind which a motorcycle manufacturer provides, with the important dimensions indicated on it and exemplified by measurement arrows a–g. A central reference point on the frame is the so-called pivot point (or "swing point") 12 which forms the starting point for the majority of the dimensions on the frame, and which is formed in the frame by the centre of a hole on each side of the frame, usually tapped. A reference, or centre, line through the pivot points 12 is designated y—y (the pivot axis).

The pivot points 12 are used as the starting point both during the straightening of the frame in the above-mentioned traction jig and during checking measurement of the frame according to the invention, as will be described.

In FIG. 4 the principal component parts of the measuring arrangement according to the invention are shown and, related to this, FIG. 3 shows a deformed motorcycle with the pivot axis y—y of the frame shown in dashes.

The measuring arrangement 10 according to the invention comprises basically a measuring beam 14 on which uprights 16 and 18 disposed at right-angles to the beam can be displaced. Arranged at an appropriate point along the measuring beam 14 there is a mounting 19 for a horizontal measuring axle 20 extending at right-angles to the measuring beam, and the measuring axle is itself equipped with a so-called adapter 22, that is, a connecting piece with dimensions and shaping adapted to the motorcycle frame which is to be measured or, more precisely, to the shape and size of the openings, the centres of which form the pivot points of the frame. Sleeves 24 and 28 respectively can be displaced on the uprights 16 and 18, and the sleeves themselves hold sliding measuring points 26 and 30 respectively, as shown in FIG. 4. For certain measurements one or both of the uprights 16 and 18 can be arranged so that they can project downwards from the measuring beam 14, as indicated by 18'. The measuring beam 14 may be pivoted around the measuring axle 20 and can be fixed in a suitable adjustable position relative to the latter, for example, with the aid of an adjustable supporting foot 32.

If the motorcycle and its frame are imagined to be placed in a co-ordinate system x-y-z, such as is indicated in FIG. 4, that is, with the x-axis in the longitudinal direction of the motorcycle, the y-axis coinciding with the pivot axis defined above, and the z-axis being a vertical axis perpendicular to the others, the co-ordinates for precise points on the motorcycle, and above all on its frame, can be determined with the aid of the measuring arrangement according to the invention, as will be described with reference to FIG. 4.

As indicated above, the measuring arrangement 10 is connected to the deformed motorcycle as shown in FIG. 3, by inserting and fixing a suitable adapter 22 connected to the axle 20 of the measuring arrangement in the pivot point of the motorcycle frame, on one side of the frame. Since the measuring axle 20 has a fixed length and the adapter 22 has specific dimensions for the object actually being measured, the measuring beam 14 takes up a specific position relative to the motorcycle frame. As stated, the uprights 16 and 18 can be displaced along the beam, and the sleeves 24 and 28 on the respective uprights, with their displaceable measuring points 26 and 30 respectively, can similarly also be displaced along the uprights. The displacement of the latter along the measuring beam is carried out in the x-direction defined above, while the sleeves are displaced in the z-direction and the measuring points in the y-direction. If the measuring beam 14 is equipped with a scale suitably orientated relative to the measuring axle 20, and the uprights and the measuring points are also calibrated in a corresponding way, then obviously precise points on the motorcycle and its frame can be found with the measuring points and their x-, y- and z-co-ordinates can be extablished by means of the scales.

Up to now the measuring and checking processes which are possible according to the invention have been described halfway, so to speak. It is obvious that a measuring arrangement can be set up on the opposite side of the motorcycle, identical with the described arrangement 10 except that the measuring axle 20 and the measuring points 26 and 30 are rotated and made to point in the opposite direction. In this way, a comparison can be made between the co-ordinates for the points which, according to the plan view in FIG. 2, should be similarly positioned, and thus the symmetry of the frame, viewed in this plane, can be checked.

The two measuring arrangements 10 arranged on either side of the motorcycle can be connected together to form a firm and stable measuring stand with the aid of cross-pieces which connect one or both the ends of the measuring beam 14 to the upper ends of the uprights 16, for example. The length of these cross-pieces which thus extends in the y-direction, is determined by the length of the measuring axles 20, the adapters 22 being used and the dimension of the width c of the frame in question across the pivot points 12, see FIG. 2.

As mentioned in the introduction, the measuring stand according to the invention is designed so that it can also be used to carry out measurements on a motorcycle which is set up or clamped in a traction jig of the above-mentioned type, for straightening or correcting operations. This arrangement will now be described, and an actual embodiment of the measuring stand according to the invention will also be described.

FIG. 5 therefore shows very schematically a traction jig 40, viewed substantially directly from the rear, with a motorcycle set up in it, ready for straightening. A traction jig of the type in question normally comprises a number of components which can be firmly connected to each other in various positions and form mountings for traction devices of various types which are known in this technical field. According to FIG. 5 the traction jig 40 comprises a base frame 42 to which a vertical upright frame 44 is firmly connected (together with other supporting or bearing components which are not shown in detail). The other design details of the traction jig fall outside the scope of the invention, but as can be seen there are two axles 20' which correspond with the measuring axles 20 described in conjunction with the measuring arrangement 10, and these are firmly connected by means of adapters (not shown in detail) to the motorcycle frame in question, at the pivot points of the latter, all as described above. With the aid of strong clamping jaws 46 these axles 20' are firmly clamped in the upright frame 44 of the traction jig, as shown in FIG. 5, and in this position the motorcycle frame can be subjected to the necessary straightening operations.

For taking checking measurements according to the invention, a measuring arrangement 10 according to the principle illustrated in FIGS. 3 and 4 is very simply attached, by connecting the mounting 19 of the arrangement or a corresponding connecting device to the projecting section of the axles 20' located outside the clamping jaws 46 on the traction jig 40. The correct orientation relative to the y-y axis direction from which the measurements are to start is thereby ensured, and checking measurements on the motorcycle and its frame can be carried out in the way described above (it is assumed that the measuring beam 14 is set up in the correct position, for example, horizontal, around the y—y axis).

FIG. 6 shows an example of an actual embodiment of a complete measuring stand according to the invention. The stand is designated 110, and the parts which recur in a modified form from the basic embodiment shown in FIG. 4 have correspondingly been given the same reference numerals as in that Figure, with the addition of 100.

The measuring stand shown in FIG. 6 thus consists of two substantially horizontal measuring beams 114 extending longitudinally (x-direction) and pivotably mounted on the measuring axles 120. As before, these are designed to be connected via adapters to a motorcycle frame at the pivot points thereof. The measuring stand shown in FIG. 6 is designed so that according to the principle of the invention it can be used both in conjunction with a traction jig and also directly on a free-standing motorcycle, and in the latter case the measuring beams 114 are connected to each other by means of a spacer frame 50 which engages, via clamping jaws 146 corresponding to the clamping jaws 46 of a traction jig, on the measuring axles 120 immediately inside the measuring beams 114, as shown in FIG. 6. As already stated, the horizontal position of the beams can be determined by means of an adjustable foot support 132.

Along the upper and lower side of the measuring beams 114 there are uprights which can be displaced in the longitudinal direction of the beam. In this case two uprights 116 are shown which project vertically upwards, and two corresponding shorter uprights 118 which project vertically downwards. The uprights are equipped with sliding sleeves 124 and 128 respectively, housing appropriately shaped measuring points 126 and 130 respectively.

In order to ensure the accurate co-action between the two sections of the measuring stand 110 located on either side of the motorcycle in this case, the upper ends of the uprights 116 and the left-hand ends of the measuring beams 114 (as viewed in the Figure) are connected by means of spacer bridges 56 and 54 respectively. These bridges, together with the frame 50, ensure that the measuring beams and the uprights are joined to form a rigid, stable measuring stand with the aid of which accurate measurements can be taken.

In order to achieve accurate and as far as possible play-free control of the mutually movable components of the measuring stand 110, these are expediently made from extruded aluminium profile specially adapted for the purpose, for example, like the examples suggested and shown in FIGS. 7a–c. The measuring beams 114 thus have the profile shown in FIG. 7a, that is, an upright box profile with slideways open to the top and to the bottom, giving access to guide channels formed in the profile, into which profiles like those shown in FIG. 7c will fit. The latter profile also fits in the profile according to FIG. 7b, which corresponds substantially with the upper and lower end sections of the profile shown in FIG. 7a. The profile shown in FIG. 7b, which is thus narrower and lighter than the profile shown in FIG. 7a, is preferably used for the uprights 116 and 118 and also for the spacer bridges 54 and 56. By means of pieces of the profile shown in FIG. 7c connected to the ends of the bridges the two parts of the stand can be connected together by pushing these profile pieces into the open ends of the uprights 116 and the measuring beams 114 respectively, as can be seen in FIG. 6. Similar pieces of profile as shown in FIG. 7c can also form slides inside the uprights and the measuring beams for guiding along the slideways thereof, e.g. the sleeves 124 and 128 of the uprights, with the measuring points 126 and 130 respectively. Also, the uprights themselves can be displaced along the measuring beams with the aid of such slides. As can be seen in FIG. 6, an internal slide like this can also be arranged in the upper spacer bridge 56 and can be connected to a vertical measuring point 58 which can be used for marking or seeking out the vertical centre plane or plane of symmetry (x-z plane) of the motorcycle or motorcycle frame being measured.

Due to its construction, the described measuring stand 110 is easy to take apart, retaining its accuracy in the assembled state. In order to make it still easier to handle the rather long measuring beams 114 are preferably divided as shown by the joint indicated by 115 in FIG. 6. In this case the parts can be connected to each other by means of push-in profiles which are inserted in the central space in the measuring beam, see FIG. 7a.

The components comprised in the measuring stand according to the invention can be temporarily locked to each other in their various adjustable positions, if desired, for instance, by means of locking knobs and similar devices.

The measuring stand 110 shown in FIG. 6 can thus be combined with a traction jig for checking measurements on a motorcycle frame while it is being straightened, or it can be connected to a free-standing motorcycle for checking possible damage or deformation of the frame, as desired. If a complete process with checking of the frame from both sides is not required, only half the stand may be used, corresponding to the illustration in FIG. 4.

It is emphasised that the stand shown in FIG. 6 and the associated profiles shown in FIGS. 7a–c are only examples, and that, from the design point of view, the stand can be made in various ways within the scope of the invention, along the lines suggested by someone skilled in the art, so that the invention is not therefore limited to the embodiments shown and exemplified.

I claim:

1. Apparatus including an arrangement for measuring and checking motorcycle frames of the kind incorporating structure defining a pair of reference points on opposite sides of the lower part of the motorcycle frame defining a reference axis (y—y) extending through the width of the motorcycle frame, said arrangement being suitable for measuring both a motorcycle frame completely or partially exposed by removal of other components of the motorcycle and a frame of a complete motorcycle, said measuring arrangement comprising:

a measuring beam connectable to the motorcycle frame at right-angles to said reference axis (y—y) with the measuring beam extending in the longitudinal direction of the motorcycle frame;

fixing means extending along said reference axis (y—y) between said reference point on said motorcycle frame and a fixed point on said beam;

at least one upright extending from the measuring beam at right-angles to a plane parallel to both the measuring beam and the reference axis (y—y), said upright being mounted for displacement (x) so that it can be moved along the beam;

at least one mounting member mounted for displacement (z) along the upright;

a measuring point displaceable in the mounting member at right-angles to both the measuring beam and the upright, with calibrations on at least the measuring beam and the upright for determining the amount of the displacement (x) of the upright along the beam in relation to the reference axis (y—y) and also the displacement (z) of the measuring point along the upright in relation to the measuring beam, and thus also the perpendicular distance of the measuring point from the reference axis (y—y).

2. Apparatus according to claim 1, wherein the fixing means engages on both sides of the motorcycle frame at the reference points and to this end comprises two measuring axle and adapter assemblies arranged on one each side of the frame, in mutually coaxial relation, and a pair of clamping jaws firmly connected to each other and located for clamping on the measuring axles on either side of the motorcycle frame intermediate the ends of the measuring axles, for pushing of the measuring beam from the outside onto either of the measuring axle ends.

3. Apparaus according to claim 2, wherein the two measuring axles are equipped with calibrations with the aid of which the motorcycle frame connected to the axles can be positioned in a desired position between the clamping jaws.

4. Apparatus according to claim 3, including a transverse, substantially U-shaped frame, the arms of which fixedly carry the clamping jaws to effect said firm connection thereof to each other.

5. Apparatus according to claim 2, wherein said clamping jaws form a fixed part of a conventional traction straightening arrangement for motorcycle frames, namely a so-called traction jig, so that the motorcycle frame can be conventionally acted on by the traction devices of the traction jig, and also measured by the measuring arrangement located on either of the measuring axles projecting from the jaws.

6. Apparatus according to claim 4, including a conventional traction jig for straightening motorcycle frames, a further pair of said clamping jaws mounted on opposite sides of said traction jig, wherein said clamping jaws of the pair connected by the said transverse frame and of the pair forming part of a traction jig are located at exactly the same chosen distance from each other along the reference axis (y—y).

7. Apparatus according to claim 1, wherein two said measuring arrangements are connected to form a rigid measuring stand, the two measuring arrangements being positioned mutually parallel and similarly oriented, and being connected to each other by at least one transverse spacer bridge which connect adjacent the opposite free ends of at least one of the measuring beams and uprights of the two measuring arrangements, the length of transverse spacer bridges being sufficient to accommodate alternatively a motorcycle frame and an entire motorcycle between said two measuring arrangements of said measuring stand suspended on their measuring axles.

8. Apparatus according to claim 7, wherein at least one of the said spacer bridges is equipped with a measuring element movable along the bridge to scan the distance between the two measuring arrangements of the measuring stand and to indicate the plane of symmetry of the stand.

9. Apparatus according to claim 1, in which said reference points are holes in said motorcycle frame, said fixing means comprising an axle member extending along said reference axis (y—y) from said beam into said hole in said frame for locating said beam on said reference axis, said axle member including an adapter changeable to fit accurately the hole of a particular motorcycle frame.

10. Apparatus according to claim 1, in which said fixing means attaches at the central portion of said beam remote from the ends of the beam, said beam extending generally the length of said motorcycle frame and having opposite end portions remote from said fixing means and simultaneously opposable to the front and rear end portions of said motorcycle frame for simultaneous checking thereof.

11. Apparatus according to claim 10, including a supporting foot depending from one end portion of said beam and fixing said beam against pivoting by engaging a supporting floor or the like.

12. An arrangement for measuring and checking motorcycle frames of the kind having pivot points on the lower part of such frame and connected by a pivot axis (y—y), including a frame completely or partially exposed by removal of other components of the motorcycle, and a frame in a complete motorcycle, such arrangement comprising:
   a fixing arrangement;
   a measuring beam designed to be connected to the motorcycle frame via said fixing arrangement at right-angles to the pivot axis (y—y) such that the measuring beam extends in the longitudinal direction of the motorcycle frame;
   the said fixing arrangement comprises a cylindrical pin, called the measuring axle, around which the measuring beam can be pivoted, and a so-called adapter designed to connect one end of the measuring axle with the motorcycle frame at the adjacent pivot point, the adapter being adapted and dimensioned according to the actual shape of the frame at the pivot points;
   at least one upright at right-angles to both the measuring beam and the pivot axis (y—y) and arranged for movement along the beam;
   at least one sleeve displaceable along the upright;
   a measuring rod or measuring point which can be displaced in the sleeve at right-angles to both the measuring beam and the upright, at least the measuring beam and the upright being equipped with calibrations for determining the amount of the displacement (x) of the upright in relation to the pivot axis (y—y) and the displacement (z) of the measuring point in relation to the measuring beam, and thus also the perpendicular distance of the measuring point from the pivot axis.

* * * * *

UNITED STATES PATENT AND TRADEMARK OFFICE
CERTIFICATE OF CORRECTION

PATENT NO.   :   4,432,144
DATED        :   February 21, 1984
INVENTOR(S)  :   Harry Carlsson It is certified that error appears in the above-identified patent and that said Letters Patent is hereby corrected as shown below:

Column 6, line 62;   change "on one each" to ---one on each---.

Column 7, line 10;   change "claim 2" to ---claim 3---.

Signed and Sealed this

Eleventh Day of September 1984

[SEAL]

Attest:

GERALD J. MOSSINGHOFF

Attesting Officer

Commissioner of Patents and Trademarks